United States Patent
Bacon et al.

(10) Patent No.: US 10,015,007 B2
(45) Date of Patent: Jul. 3, 2018

(54) PERFORMING EFFICIENT COMPARISON OPERATIONS ON ENCRYPTED DATA

(71) Applicant: International Business Machines Corporation, Armonk, NY (US)

(72) Inventors: David F. Bacon, Sleepy Hollow, NY (US); Graham A. Bent, Hursley (GB); Flavio A. Bergamaschi, Southampton (GB); Wei Zhang, Egham (GB)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 14/952,210

(22) Filed: Nov. 25, 2015

(65) Prior Publication Data

US 2017/0149557 A1 May 25, 2017

(51) Int. Cl.
*H04L 9/00* (2006.01)
*H04L 9/30* (2006.01)

(52) U.S. Cl.
CPC ............ *H04L 9/008* (2013.01); *H04L 9/3093* (2013.01)

(58) Field of Classification Search
CPC .............................. H04L 9/008; H04L 9/3093
See application file for complete search history.

(56) References Cited

U.S. PATENT DOCUMENTS

| 8,045,711 B2 | 10/2011 | Kerschbaum |
| 8,249,250 B2 | 8/2012 | Rane |
| 2013/0170640 A1 | 7/2013 | Gentry |
| 2014/0133651 A1 | 5/2014 | Furukawa |

OTHER PUBLICATIONS

Z. Brakerski, et al., "Fully Homomorphic Encryption without Bootstrapping," Innovations in Theoretical Computer Science, ITCS 2012.
M. Togan, et al., "Comparison-Based Computations Over Fully Homomorphic Encrypted Data," IEEE 2014 10th International Conference on Communications (COMM), May 2014.
T. Veugen, "Comparing Encrypted Data," Multimedia Signal Processing Group, Delft University of Technology, The Netherlands, and TNO Information and Communication Technology, Delft, The Netherlands, 2010, http://insy.ewi.tudelft.nl/sites/default/files/Comparing%20encrypted%20data.pdf.

*Primary Examiner* — Beemnet Dada
(74) *Attorney, Agent, or Firm* — Anthony V. S. England; Nicholas Bowman

(57) ABSTRACT

In computer-implemented technology for comparing first and second values that are encrypted according to a fully homomorphic encryption scheme, the following function is computed:

$$f(\varepsilon(x), \varepsilon(y)) = \begin{cases} \varepsilon(0) \ldots \text{if} \ldots x \neq y \\ \varepsilon(1) \ldots \text{if} \ldots x = y \end{cases}$$

where $\varepsilon(.)$ is a fully homomorphic encryption scheme.

21 Claims, 3 Drawing Sheets

PERFORMING EFFICIENT COMPARISON OPERATIONS ON ENCRYPTED DATA

STATEMENT REGARDING FEDERALLY SPONSORED RESEARCH OR DEVELOPMENT

This invention was made with United States Government support under contract number W911NF-06-3-0001 awarded by the United States Army. The United States government has certain rights to this invention.

This invention was made with United Kingdom Government support under contract number W911NF-06-3-0001 awarded by the Ministry of Defense.

BACKGROUND

The present invention relates to performing efficient comparison operations on encrypted data, and more specifically to a comparison operation providing a result of an encryption of "one" when two values to be compared are equal and an encryption of "zero" when two values to be compared are unequal.

Zvika Brakerski, Craig Gentry, and Vinod Vaikuntanathan, 2012, "Fully homomorphic encryption without bootstrapping", in Proceedings of the 3rd Innovations in Theoretical Computer Science Conference (ITCS '12), ACM, New York, N.Y., USA, 309-325 discloses a fully homomorphic encryption (FHE) scheme based on the ring learning with error (RWLE) scheme that have $2^\lambda$ security against known attacks. This scheme will be referred to as the "BGV scheme".

SUMMARY

According to an embodiment of the invention, a computer-implemented method for comparing a first value and a second value, the first and second values being encrypted according to a fully homomorphic encryption scheme, comprises computing the function:

$$f(\varepsilon(x), \varepsilon(y)) = \begin{Bmatrix} \varepsilon(0) \ \ldots \ \text{if} \ \ldots \ x \neq y \\ \varepsilon(1) \ \ldots \ \text{if} \ \ldots \ x = y \end{Bmatrix}$$

where $\varepsilon(.)$ is a fully homomorphic encryption scheme.

In an embodiment of the invention, said first and said second values are encrypted binary values, the encrypted binary values being two binary bit strings $a_1 a_2 \ldots a_n$ and $b_1 b_2 \ldots b_n$, represented as $a_i$ and $b_i$, encrypted so as to obtain $\varepsilon(a_i)$ and $\varepsilon(b_i)$ for $i=1, \ldots, n$; and said function is computed by: computing the function $f(\varepsilon(a_i),\varepsilon(b_i))=(\varepsilon(a_i)-\varepsilon(b_i))\cdot(\varepsilon(b_i)-\varepsilon(a_i))+\varepsilon(1)$ for each of $i=1, \ldots, n$; and homomorphically computing the product of the function computed for each of $i=1, \ldots, n$ according to the following formula:

$$\text{Result} = \prod_{i=1}^{n} f(\varepsilon(a_i), \varepsilon(b_i)).$$

In another embodiment of the invention, said first value is a first binary bit string $a_1 a_2 \ldots a_n$ represented as $a_i$ and encoded into an element of an integer polynomial ring representation so as to obtain $\varepsilon(a_i)$ for $i=1, \ldots, n$ and said second value is a second binary bit string $b_1 b_2 \ldots b_n$, represented as $b_i$, encoded into an element of an integer polynomial ring representation so as to obtain $\varepsilon(a_i)$ for $i=1, \ldots, n$ and encrypted so as to obtain $\varepsilon(b_i)$; and said function is computed by: computing the function $f(\varepsilon(a_i),b_i)=(\varepsilon(\bar{a}_i)b_i+\varepsilon(a_i)\bar{b}_i)\times(-1)+\varepsilon(1)$, where $\varepsilon(\bar{a}_i)=\varepsilon(a_i)\times(-1)+\varepsilon(1)$, and $\bar{b}_i=b_i\times(-1)+1$; and homomorphically computing the product of the function computed for each of $i=1, \ldots, n$ according to the following formula:

$$\text{Result} = \prod_{i=1}^{n} f(\varepsilon(a_i), \varepsilon(b_i)).$$

In another embodiment of the invention, said first and said second values are non-binary values encrypted according to a fully homomorphic encryption scheme and said function is computed by: said first and said second values are represented as encrypted binary values, the encrypted binary values being two binary bit strings $a_1 a_2 \ldots a_n$ and $b_1 b_2 \ldots b_n$, represented as $a_i$ and $b_i$, encrypted so as to obtain $\varepsilon(a_i)$ and $\varepsilon(b_i)$ for $i=1, \ldots, n$; computing the function $$f(\varepsilon(a_i),\varepsilon(b_i))=\varepsilon(1)-[\varepsilon(a_i)-\varepsilon(b_i)]^{p-1} \bmod p;$$

and homomorphically computing the product of the function computed for each of $i=1, \ldots, n$ according to the following formula:

$$\text{Result} = \prod_{i=1}^{n} f(\varepsilon(a_i), \varepsilon(b_i)).$$

Embodiments of the invention provide a homomorphic comparator for comparing a first value and a second value, the first and second values being encrypted according to a fully homomorphic encryption scheme, the homomorphic comparator comprising: a homomorphic computer for computing the function:

$$f(\varepsilon(a), \varepsilon(b)) = \begin{Bmatrix} \varepsilon(0) \ \ldots \ \text{if} \ \ldots \ a \neq b \\ \varepsilon(1) \ \ldots \ \text{if} \ \ldots \ a = b \end{Bmatrix}$$

where $\varepsilon(.)$ is a fully homomorphic encryption scheme.

Embodiments of the invention also provide a computer program product for comparing a first value and a second value, the first and second values being encrypted according to a fully homomorphic encryption scheme, the computer program product comprising: a computer readable storage medium having program instructions embodied therewith, the program instructions executable by a computer to cause the computer to: compute the function:

$$f(\varepsilon(a), \varepsilon(b)) = \begin{Bmatrix} \varepsilon(0) \ \ldots \ \text{if} \ \ldots \ a \neq b \\ \varepsilon(1) \ \ldots \ \text{if} \ \ldots \ a = b \end{Bmatrix}$$

where $\varepsilon(.)$ is a fully homomorphic encryption scheme.

BRIEF DESCRIPTION OF THE DRAWINGS

Preferred embodiments of the present invention will now be described in more detail, by way of example only, with reference to the accompanying drawings, in which.

DETAILED DESCRIPTION

Comparing encrypted values is a fundamental operation that is used in computing for encrypted data applications. When performing computation on encrypted data, a common requirement is to be able to compare two encrypted values to determine if they are equal or not. Whilst these operations in binary message spaces are trivial, in non-binary message spaces the comparison operations become more complex.

Embodiments of the present invention involve recognition that it is desirable in this context to find a function of the form:

$$f(\varepsilon(x), \varepsilon(y)) = \left\{ \begin{array}{l} \varepsilon(0) \ldots \text{if} \ldots x \neq y \\ \varepsilon(1) \ldots \text{if} \ldots x = y \end{array} \right\}$$

That is, in this function of two encrypted values, the function evaluates to an encryption of one when the encrypted values are equal and to an encryption of zero otherwise. Embodiments of the present invention also involve recognition that $\varepsilon(.)$ in this function may be computed by applying fully homomorphic encryption (FHE) schemes, such as the BGV scheme, and that the evaluation of this function in a typical application enables, for example, the result to be used to select values from a key value store or to evaluate intersections between data sets in a two party oblivious transfer without revealing any information about the other values in the data sets.

Figure 1:
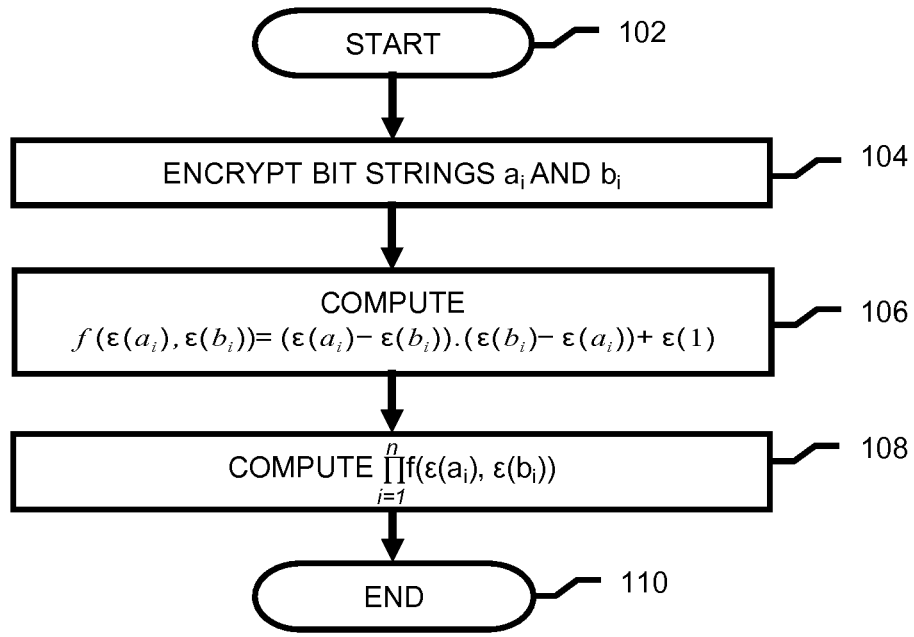
FIG. 1 shows a flow chart of a first embodiment of a computer-implemented method for comparing a first value and a second value, the first and second values being encrypted binary values according to a fully homomorphic encryption scheme.

Referring to FIG. 1, in a first embodiment of homomorphic comparison operations, a first value and a second value in a data processing system are compared, the first and second values being binary values encrypted according to a fully homomorphic encryption scheme.

Let $a_1 a_2 \ldots a_n$ and $b_1 b_2 \ldots b_n$ be two binary bit strings that it is desired to compare. Since the real values that are to be represented are not binary, each bit is represented as an encryption of "1" or an encryption of "0". The method of the first embodiment starts at step 102.

At step 104, the two binary bit strings $a_1 a_2 \ldots a_n$ and $b_1 b_2 \ldots b_n$, represented as $a_i$ and $b_i$ are encrypted so as to obtain $\varepsilon(a_i)$ and $\varepsilon(b_i)$ for $i=1, \ldots, n$.

At step 106, the function $f(\varepsilon(a_i), \varepsilon(b_i))$ for each of $i=1, \ldots, n$ is computed.

$$f(\varepsilon(a_i), \varepsilon(b_i)) \text{ for } i=1, \ldots, n.$$

In order to compute this function, a homomorphic computation of the XNOR function is required. This can be achieved as follows:

$$f: \{0,1\} \times \{0,1\} \rightarrow$$

$$(a,b) \rightarrow (a-b)(b-a)+1$$

$$f(\varepsilon(a), \varepsilon(b)) = (\varepsilon(a)-\varepsilon(b)) \cdot (\varepsilon(b)-\varepsilon(a)) + \varepsilon(1)$$

The homomorphic computation requires three homomorphic additions and one homomorphic multiplication per bit of the bit string. Since these multiplication operations can be performed independently the operation consumes only one level.

At step 108, the results, computed at step 106, of the function $f(\varepsilon(a_i), \varepsilon(b_i))$ for each of $i=1, \ldots, n$ is computed homomorphically according to the following formula:

$$\text{Result} = \prod_{i=1}^{n} f(\varepsilon(a_i), \varepsilon(b_i)).$$

The homomorphic product computation requires a further $(n-1)$ homomorphic multiplications, which can be done in a binary tree manner. This consumes a further $\text{ceil}(\log(n))$ levels in the BGV scheme. The total cost is therefore $(2n-1)$ homomorphic multiplications consuming $\text{ceil}(\log(n))+1$ levels.

Figure 2:
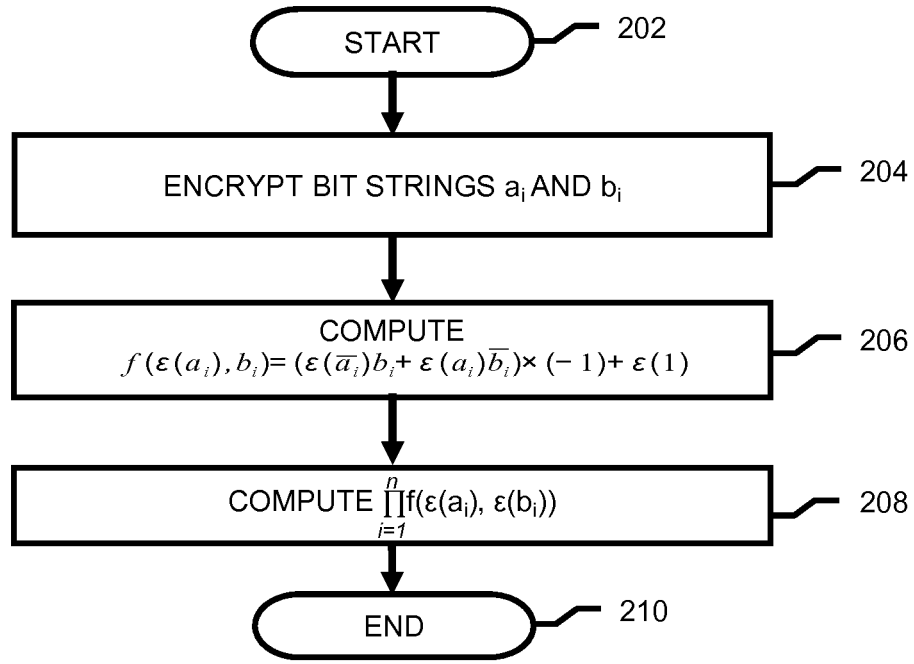
FIG. 2 shows a flow chart of a second embodiment of a computer-implemented method for comparing a first value and a second value, the first value being an encrypted, encoded value and the second value being an encrypted value according to a fully homomorphic encryption scheme.

Referring to FIG. 2, in a second embodiment of homomorphic comparison operations, a first value and a second value in a data processing system are compared, the first value being an encrypted, encoded value and said second value being an encoded value. The first value is encrypted according to a fully homomorphic scheme. Both the first and second values are encoded into elements of an integer polynomial ring representation.

One interesting feature of the BGV scheme is that it supports polynomial multiplication operations between a ciphertext and an encoded plaintext message without the need for an expensive refresh step. Encoding a message into an element of an integer polynomial ring representation, but without encrypting the message, means that efficient comparisons with an encrypted ciphertext can be performed.

If $D(.)$ is the homomorphic decryption algorithm, then:

$$\text{If } c_3 = m_1 c_2, \text{ then } D(c_3) = m_1 \times m_2, \text{ where } m_2 = D(c_2)$$

where m1 is an encoded message plaintext and c2 is a ciphertext, that is an encrypted, encoded plaintext.

The method of the second embodiment starts at step 202. At step 204, a binary bit string $a_1 a_2 \ldots a_n$ represented as $a_i$ is encoded and a binary bit string $b_1 b_2 \ldots b_n$, and $b_i$ is first encoded, then encrypted so as to obtain $\varepsilon(a_i)$ and $\varepsilon(b_i)$ for $i=1, \ldots, n$. The real values that are to be represented are not binary, so each bit is represented as an encryption of "1" or an encryption of "0".

At step 206, the function $f(\varepsilon(a_i), \varepsilon(b_i))$ for each of $i=1, \ldots, n$ is computed.

$$f(\varepsilon(a_i), \varepsilon(b_i)) \text{ for } i=1, \ldots, n.$$

In order to compute this function, a homomorphic computation of the XNOR function is required. This can be achieved for an encrypted, encoded ciphertext and an encoded plaintext as follows:

$$f: \{0,1\} \times \{0,1\} \rightarrow$$

$$(a,b) \rightarrow (\bar{a}b - a\bar{b}) \times (-1) + 1$$

$$f(\varepsilon(a),b) = (\varepsilon(\bar{a})b + \varepsilon(a)\bar{b}) \times (-1) + \varepsilon(1)$$

Note that $\varepsilon(\bar{a}) = \varepsilon(a) \times (-1) + \varepsilon(1)$, and similarly $\bar{b} = b \times (-1) + 1$. Also note that in order to compute $\varepsilon(1)$, the public key with which the input strings were encrypted must be known and used to produce the encryption of "one".

The homomorphic computation requires four homomorphic additions and three ciphertext by plaintext multiplications. The ciphertext by plaintext multiplications are relatively inexpensive since they are simply polynomial multiplication operations without the need for an expensive refresh operation and therefore do not consume any levels in the scheme.

At step 208, the results, computed at step 206, of the function $f(\varepsilon(a_i), \varepsilon(b_i))$ for each of $i=1, \ldots, n$ is computed homomorphically according to the following formula:

$$\text{Result} = \prod_{i=1}^{n} f(\varepsilon(a_i), \varepsilon(b_i))$$

The product requires a further (n-1) homomorphic multiplications, which can be done in a binary tree manner. This consumes a further ceil(log(n)) levels in the BGV scheme. The total cost is therefore (2n-1) homomorphic multiplications consuming ceil(log(n))+1 levels.

Figure 3:
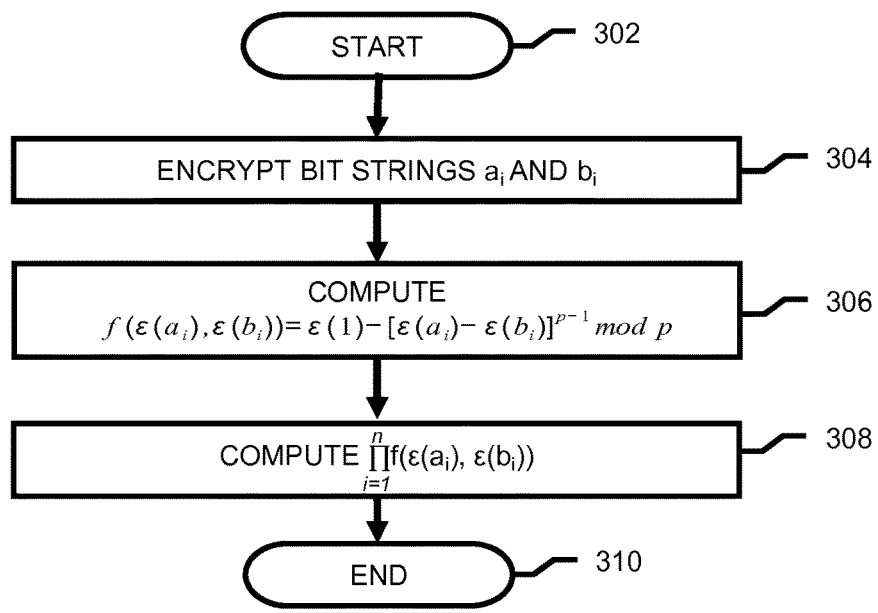
FIG. 3 shows a flow chart of a third embodiment of a computer-implemented method for comparing a first value and a second value, the first and second values being non-binary values encrypted according to a fully homomorphic encryption scheme.

Referring to FIG. 3, in a third embodiment of homomorphic comparison operations, a first value and a second value in a data processing system are compared, wherein the first and the second values are non-binary values, encrypted according to a fully homomorphic encryption scheme.

In this embodiment the first value and the second value are each ciphertexts, which may be any value in the range $0, \ldots d*\log(p)$. If p is chosen to be a prime then Fermat's Little Theorem can be applied as below.

Fermat's little theorem states that if p is a prime number, then for any integer a, the number $a^p - a$ is an integer multiple of p. In the notation of modular arithmetic, this is expressed as $a^p \eta a \pmod{p}$. For example, if a=3 and p=5, $3^5=243$, and 243-3=240 which is an integer multiple of 5. If a is not divisible by p, Fermat's little theorem is equivalent to the statement that $a^{p-1} - 1$ is an integer multiple of p, or in symbols $a^{p-1} \eta 1 \pmod{p}$. For example, if a=3 and p=5 then $3^4=81$ and 81-1=80 which is an integer multiple of 5.

The method of the third embodiment starts at step 302. At step 304, a binary bit string $a_1 a_2 \ldots a_n$ represented as $a_i$ is encoded and a binary bit string $b_1 b_2 \ldots b_n$, and $b_i$ is first encoded, then encrypted so as to obtain $\varepsilon(a_i)$ and $\varepsilon(b_i)$ for $i=1, \ldots, n$.

At step 306, $$f: \{0, p-1\} \times \{0, p-1\} \rightarrow$$

$$(a,b) \rightarrow 1 - (a-b)^{p-1} \bmod p$$

$$f(\varepsilon(a), \varepsilon(b)) = (\varepsilon(1) - [\varepsilon(a) - \varepsilon(b)]^{p-1} \bmod p$$

This function can be computed using modular exponentiation by squaring. Expressing p in bits to compare with the first embodiment and the second embodiment, this third embodiment requires n homomorphic multiplications and consumes n levels.

Whilst the cost of performing the comparison in the third embodiment is significantly higher in terms of the number of levels consumed than in the first embodiment or the second embodiment, the third embodiment has the advantage that messages of length up to $d*\log(p)$ bits can be encrypted in a single ciphertext where the first embodiment and the second embodiment require each bit of the message to be encrypted in separate ciphertexts.

Each of the first, second and third embodiments may be used to perform comparison operations on batched ciphertexts. This means that multiple operations can be performed slotwise in a single homomorphic multiplication. The resulting ciphertext contains slots that encrypt a zero where the corresponding slots in the original ciphertexts differ and an encryption of one where the corresponding slots are equal.

The different embodiments described above of performing the comparison operation are applicable to a range of applications. The choice of which embodiment to use is application specific and depends not only on the cost of performing the comparison operations but also on the cost of transmitting the ciphertexts between the different parties involved in the computation.

Figure 4:
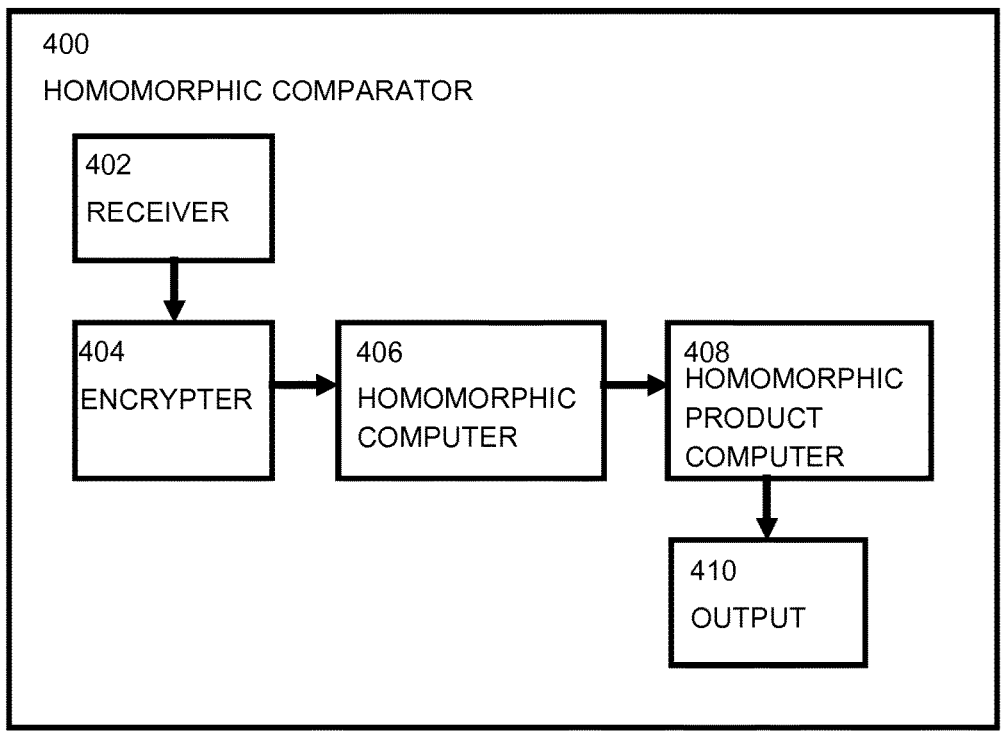
FIG. 4 shows a flow chart of an embodiment of a system for comparing a first value and a second value, the first and second values being encrypted according to a fully homomorphic encryption scheme.

Referring now to FIG. 4, which is a block diagram of a homomorphic comparator 400 for comparing a first value and a second value, the first and second values being encrypted according to a fully homomorphic encryption scheme. Receiver 402 receives the first and second values and passes them on to encrypter 404. Encrypter 404 takes the first value and the second value, that is, the binary bit string $a_1 a_2 \ldots a_n$ represented as $a_i$ and the binary bit string $b_1 b_2 \ldots b_n$, and $b_i$ and encrypts them so as to obtain $\varepsilon(a_i)$ and $\varepsilon(b_i)$ for $i=1, \ldots, n$.

In a first embodiment of homomorphic computer 406, the function $f(\varepsilon(a_i), \varepsilon(b_i))$ for each of $i=1, \ldots, n$ is computed.

$$f(\varepsilon(a_i), \varepsilon(b_i)) \text{ for } i=1, \ldots, n.$$

In order to compute this function, a homomorphic computation of the XNOR function is required. This can be achieved as follows:

$$f: \{0,1\} \times \{0,1\} \rightarrow$$

$$(a,b) \rightarrow (a-b)(b-a) + 1$$

$$f(\varepsilon(a), \varepsilon(b)) = (\varepsilon(a) - \varepsilon(b)) \cdot (\varepsilon(b) - \varepsilon(a)) + \varepsilon(1)$$

The homomorphic computation requires three homomorphic additions and one homomorphic multiplication per bit of the bit string. Since these multiplication operations can be performed independently the operation consumes only one level.

In a second embodiment of homomorphic computer 406, the function $f(\varepsilon(a_i), \varepsilon(b_i))$ for each of $i=1, \ldots, n$ is computed.

$$f(\varepsilon(a_i), \varepsilon(b_i)) \text{ for } i=1, \ldots, n.$$

In order to compute this function, a homomorphic computation of the XNOR function is required. This can be achieved for an encrypted, encoded ciphertext and an encoded plaintext as follows:

$$f: \{0,1\} \times \{0,1\} \rightarrow$$

$$(a,b) \rightarrow (\bar{a}b - a\bar{b}) \times (-1) + 1$$

$$f(\varepsilon(a), \varepsilon(b)) = (\varepsilon(\bar{a})b + \varepsilon(a)\bar{b}) \times (-1) + \varepsilon(1)$$

Note that $\varepsilon(\bar{a}) = \varepsilon(a) \times (-1) + \varepsilon(1)$, and similarly $\bar{b} = b \times (-1) + 1$.

The homomorphic computation requires four homomorphic additions and three ciphertext by plaintext multiplications. The ciphertext by plaintext multiplications are relatively inexpensive since they are simply polynomial multiplication operations without the need for an expensive refresh operation and therefore do not consume any levels in the scheme.

In a third embodiment of homomorphic computer 406, the function $f(\varepsilon(a_i),\varepsilon(b_i))$ for each of $i=1, \ldots, n$ is computed.

$$f:\{0,p-1\}\times\{0,p-1\}\to$$

$$(a,b)\to 1-(a-b)^{p-1} \bmod p$$

$$f(\varepsilon(a),\varepsilon(b))=(\varepsilon(1)-[\varepsilon(a)-\varepsilon(b)]^{p-1} \bmod p$$

This function can be computed using modular exponentiation by squaring. Expressing p in bits to compare with the first embodiment and the second embodiment, this third embodiment requires n homomorphic multiplications and consumes n levels.

The homomorphic product computer 408 computes the homomorphic product of the function $f(\varepsilon(a_i),\varepsilon(b_i))$ for each of $i=1, \ldots, n$.

$$\text{Result} = \prod_{i=1}^{n} f(\varepsilon(a_i), \varepsilon(b_i)).$$

The product computation requires a further (n−1) homomorphic multiplications, which can be done in a binary tree manner. This consumes a further ceil(log(n)) levels in the BGV scheme. The total cost is therefore (2n−1) homomorphic multiplications consuming ceil(log(n))+1 levels.

Output 410 provides the result of the comparison operation on the two input values. As described above, the result from output 410 will be either an encryption of "1" or an encryption of "0".

Figure 5:
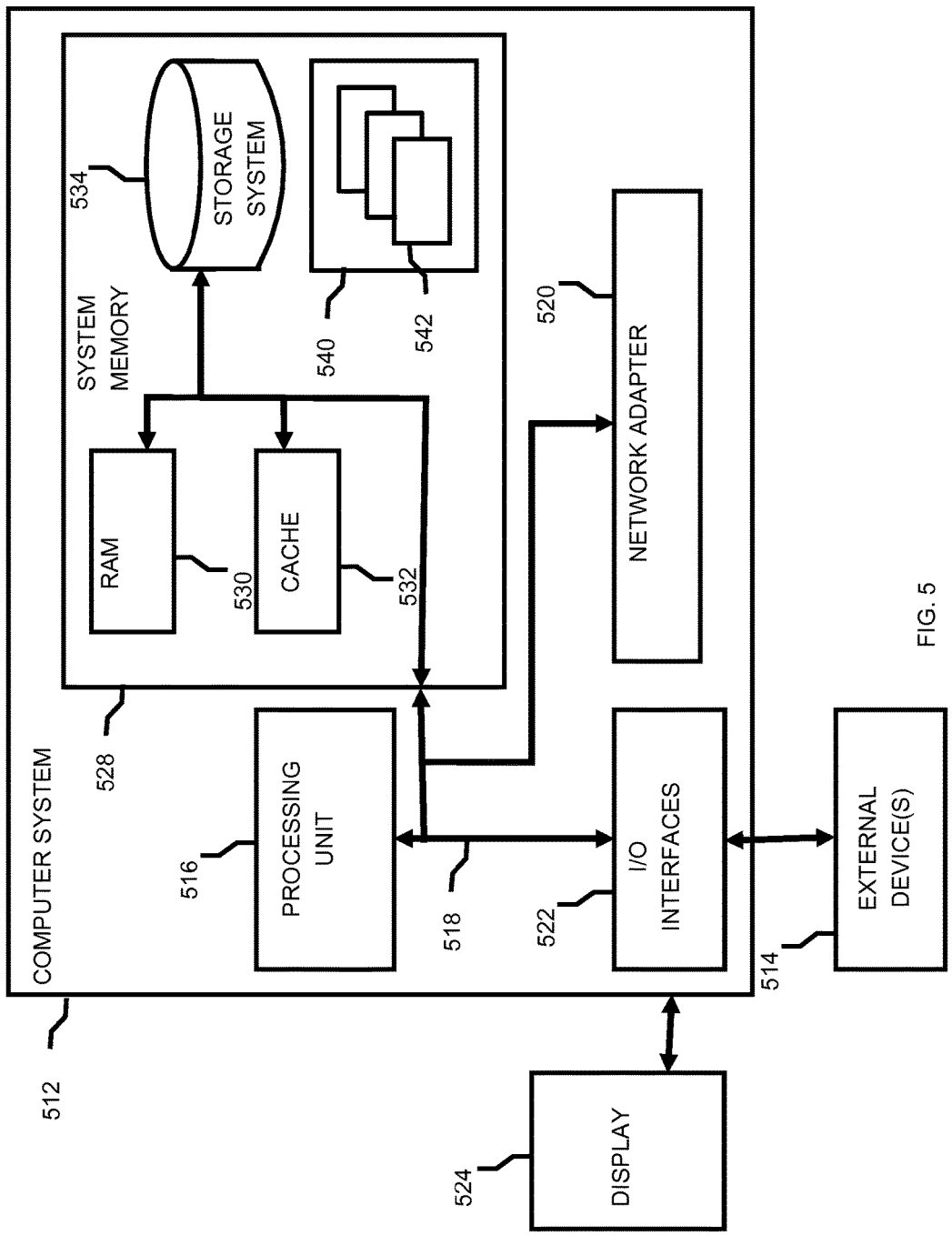
FIG. 5 depicts a computer system in which embodiments of the present invention may be implemented.

Referring now to FIG. 5, a schematic of an example of computing system is shown. Computing system 512 is only one example of a suitable computing system and is not intended to suggest any limitation as to the scope of use or functionality of embodiments of the invention described herein. Regardless, computing system 512 is capable of being implemented and/or performing any of the functionality set forth hereinabove.

Computer system/server 512 is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for comparing a first value and a second value via a fully homomorphic encryption scheme, comprising:
   receiving first and second values by an encrypter and encrypting at least one of the first and second values to obtain $\varepsilon(a_i)$ and $\varepsilon(b_i)$ for each of i=1, . . . , n;
   receiving $\varepsilon(a_i)$ and $\varepsilon(b_i)$ by a homomorphic computer and computing results for a first function $f(\varepsilon(a_i)$ and $\varepsilon(b_i)$ for each of i=1, . . . , n;
   receiving the computed results for each of i=1, . . . , n by a homomorphic product computer and homomorphically computing a product of the results for each of i=1, . . . , n according to the formula $$\text{Product} = \prod_{i=1}^{n} f(\varepsilon(a_i), \varepsilon(b_i))$$

and outputting the product, where the product yields $$\left\{ \begin{array}{l} \varepsilon(0) \ldots \text{if} \ldots a \neq b \\ \varepsilon(1) \ldots \text{if} \ldots a = b \end{array} \right\},$$

where $\varepsilon(.)$ is a fully homomorphic encryption scheme, and where computing the first function and the product reduces computational resources required to compare the first and second values.

2. The computer-implemented method of claim 1, wherein: said first and said second values received by the encrypter are binary values; and
   said first function is computed by $$f(\varepsilon(a_i),\varepsilon(b_i))=(\varepsilon(a_i)-\varepsilon(b_i))\cdot(\varepsilon(b_i)-\varepsilon(a_i))+\varepsilon(1) \text{ for each of } i=1,\ldots,n.$$

3. The computer-implemented method of claim 2, wherein said first value and said second value comprise a plurality of slots, each slot containing a single ciphertext.

4. The computer-implemented method of claim 1, wherein:
   said first value is a first binary bit string $a_1 a_2 \ldots a_n$ represented as $a_i$ and encoded into an element of an integer polynomial ring representation to obtain $\varepsilon(a_i)$ for i=1, . . . , n and said second value is a second binary bit string $b_1 b_2 \ldots b_n$, represented as $b_i$ encoded into an element of an integer polynomial ring representation to obtain $\varepsilon(a_i)$ for i=1, . . . , n and encrypted to obtain $\varepsilon(b_i)$; and
   said first function is computed by $$f(\varepsilon(a_i),b_i)=(\varepsilon(\overline{a_i})b_i+\varepsilon(a_i)\overline{b_i})\times(-1)+\varepsilon(1), \text{ where } \varepsilon(\overline{a_i})\times(-1)+\varepsilon(1), \text{ and } \overline{b_i}=b_i\times(-1)+1.$$

5. The computer-implemented method of claim 4, wherein said first value and said second value comprise a plurality of slots, each slot containing a single ciphertext.

6. The computer-implemented method of claim 1, wherein said first and said second values received by the encrypter are non-binary values; and
   said first function is computed by $$f(\varepsilon(a_i),\varepsilon(b_i))=\varepsilon(1)-[\varepsilon(a_i)-\varepsilon(b_i)]^{p-1} \bmod p.$$

7. The computer-implemented method of claim 6, wherein said first value and said second value comprise a plurality of slots, each slot containing a single ciphertext.

8. A homomorphic comparator for comparing a first value and a second value according to a fully homomorphic encryption scheme, the homomorphic comparator comprising:
   an encrypter that receives first and second values by an encrypter and encrypts at least one of the first and second values to obtain $\varepsilon(a_i)$ and $\varepsilon(b_i)$ for i=1, . . . , n;
   a homomorphic computer that receives for computing the function $\varepsilon(a_i)$ and $\varepsilon(b_i)$ and computes results for a first function $f(\varepsilon(a_i)$ and $\varepsilon(b_i)$ for each of i=1, . . . , n;
   a homomorphic computer that receives the computed results for each of i=1, . . . , n and homomorphically computes a product of the results for each of i=1, . . . , n according to the formula $$\text{Product} = \prod_{i=1}^{n} f(\varepsilon(a_i), \varepsilon(b_i))$$

and outputs the product, where the product yields $$\left\{ \begin{array}{l} \varepsilon(0) \ldots \text{if} \ldots a \neq b \\ \varepsilon(1) \ldots \text{if} \ldots a = b \end{array} \right\},$$

where $\varepsilon(.)$ is a fully homomorphic encryption scheme, and where computing the first function and the product reduces computational resources required to compare the first and second values.

9. The system of claim 8, wherein:
   said first and said second values received by the encrypter are binary values; and
   said homomorphic computer computes the first function by computing $$f(\varepsilon(a_i),\varepsilon(b_i))=(\varepsilon(a_i)-\varepsilon(b_i))\cdot(\varepsilon(b_i)-\varepsilon(a_i))+\varepsilon(1) \text{ for each of } i=1,\ldots,n.$$

10. The system of claim 9, wherein said first value and said second value comprise a plurality of slots, each slot containing a single ciphertext.

11. The system of claim 8, wherein:
   said first value is a first binary bit string $a_1 a_2 \ldots a_n$ represented as $a_i$ and encoded into an element of an integer polynomial ring representation so as to obtain $\varepsilon(a_i)$ for i=1, . . . , n and said second value is a second binary bit string $b_1 b_2 \ldots b_n$, represented as $b_i$, encoded into an element of an integer polynomial ring representation so as to obtain $\varepsilon(a_i)$ for i=1, . . . , n and encrypted to obtain $\varepsilon(b_i)$; and
   said homomorphic computer computes the first function $$f(\varepsilon(a),b)=(\overline{(a)}b+\varepsilon(a)\overline{b}))\times(-1)+\varepsilon(1), \text{ where } \varepsilon(\overline{a})=\varepsilon(a)\times\varepsilon(-1)+\varepsilon(1), \text{ and } \overline{b}=b\times(-1)+1.$$

12. The system of claim 11, wherein said first value and said second value comprise a plurality of slots, each slot containing a single ciphertext.

13. The system of claim 8, wherein said first and said second values received by the encrypter are non-binary values; and said homomorphic computer computes the first function by computing $$f(\varepsilon(a),\varepsilon(b))=\varepsilon(1)-[\varepsilon(a)-\varepsilon(b)]^{p-1} \bmod p.$$

14. The system of claim 13, wherein said first value and said second value comprise a plurality of slots, each slot containing a single ciphertext.

15. A computer program product for comparing a first value and a second value according to a fully homomorphic encryption scheme, the computer program product comprising:

a computer readable storage medium having program instructions embodied therewith, the program instructions executable by a computer to cause the computer to:

receive first and second values by an encrypter and encrypt the first and second values to obtain $\varepsilon(a_i)$ and $\varepsilon(b_i)$ for i=1, . . . , n;

receive $\varepsilon(a_i)$ and $\varepsilon(b_i)$ by a homomorphic computer and compute results for a first function $f(\varepsilon(a_i)$ and $\varepsilon(b_i)$ for each of i=1, . . . , n;

receive the computed results for each of i=1, . . . , n by a homomorphic product computer and homomorphically compute a product of the results for each of i=1, . . . , n according to the formula $$\text{Product} = \prod_{i=1}^{n} f(\varepsilon(a_i), \varepsilon(b_i))$$

and output the product, where the product yields $$\begin{cases} \varepsilon(0) \ldots \text{if} \ldots a \neq b \\ \varepsilon(1) \ldots \text{if} \ldots a = b \end{cases},$$

where $\varepsilon(.)$ is a fully homomorphic encryption scheme, and where computing the first function and the product reduces computational resources required to compare the first and second values.

16. The computer program product of claim 15, wherein:

said first and said second values received by a the encrypter are binary values; and said first function is computed by $$f(\varepsilon(a_i),\varepsilon(b_i))=(\varepsilon(a_i)-\varepsilon(b_i))\cdot(\varepsilon(b_i)-\varepsilon(a_i))+\varepsilon(1) \text{ for each} $$
$$\text{of } i=1, \ldots, n.$$

17. The computer program product of claim 16, wherein said first value and said second value comprise a plurality of slots, each slot containing a single ciphertext.

18. The computer program product of claim 15, wherein:

said first value is a first binary bit string $a_1 a_2 \ldots a_n$ represented as $a_i$ and encoded into an element of an integer polynomial ring representation so as to obtain $\varepsilon(a_i)$ for i=1, . . . , n and said second value is a second binary bit string $b_1 b_2 \ldots b_n$, represented as $b_i$, encoded into an element of an integer polynomial ring representation to obtain $\varepsilon(a_i)$ for i=1, . . . , n and encrypted to obtain $\varepsilon(b_i)$; and said first function is computed by $$f(\varepsilon(a_i),b_i)=(\varepsilon(\overline{a_i})b_i+\varepsilon(a_i)\overline{b_i})\times(-1)+\varepsilon(1), \text{ where}$$
$$\varepsilon(\overline{a})=\varepsilon(a)\times(-1)+\varepsilon(1), \text{ and } \overline{b}=b\times(-1)1.$$

19. The computer program product of claim 18, wherein said first value and said second value comprise a plurality of slots, each slot containing a single ciphertext.

20. The computer program product of claim 15, wherein said first and said second values received by the encrypter are non-binary values; and said first function is computed by $$f(\varepsilon(a),\varepsilon(b))=\varepsilon(1)-[\varepsilon(a)-\varepsilon(b)]^{p-1} \bmod p.$$

21. The computer program product of claim 20, wherein said first value and said second value comprise a plurality of slots, each slot containing a single ciphertext.

* * * * *